April 9, 1968        R. D. BAUM        3,377,552
MEANS AND METHOD FOR TESTING IMPEDANCES BETWEEN
A PLURALITY OF CONDUCTORS
Filed Nov. 17, 1964
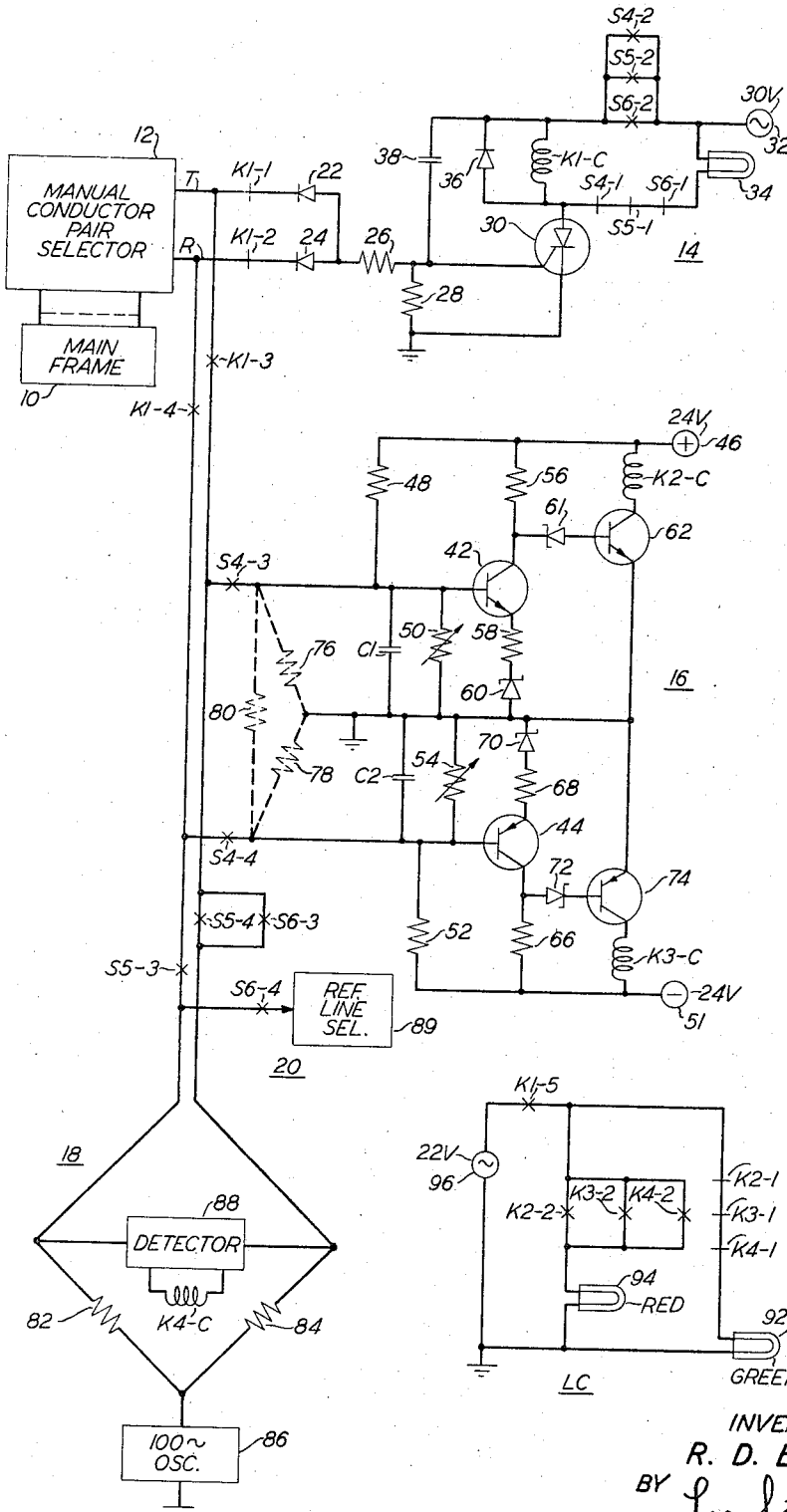
INVENTOR
R. D. BAUM
BY Leo Stanger
ATTORNEY United States Patent Office 3,377,552
Patented Apr. 9, 1968

3,377,552
MEANS AND METHOD FOR TESTING IMPEDANCES BETWEEN A PLURALITY OF CONDUCTORS
Roger D. Baum, Piscataway Township, Middlesex County, N.J., assignor to Bell Telephone Laboratories, Incorporated, New York, N.Y., a corporation of New York
Filed Nov. 17, 1964, Ser. No. 411,733
10 Claims. (Cl. 324—51)

This invention relates to test instruments, particularly for ascretaining the absence of faults in the numerous conductor pairs of a telephone cable. An object of the invention is to simplify the checking process by reducing the number of measurements to check each conductor pair.

Testing a plurality of conductor pairs in a telephone cable involves consecutively connecting test leads to each ring and tip line that makes up each conductor pair and then separately checking the pair to see if there exists a short circuit between the tip conductor and ground, if there exists a short circuit between the ring conductor and ground, if there exists a short circuit between the conductors, and if there exists a break in one or the other conductor. This procedure is extensive and tedious, particularly when large numbers of pairs must be tested. It also requires that before connecting test circuits to any one pair an operator must be careful to investigate the condition of the pair to see if it is working by transmitting information or whether it is vacant. This only adds to the complexity of the measuring procedure.

An object of the present invention is to simplify the test procedure.

Another object of the invention is to simplify and hasten the testing procedure by requiring as few measurements as possible for each conductor pair to obtain all the necessary information.

Still another object of the invention is to accomplish these measurements without complex and costly equipment.

According to the invention the number of separate measurements is reduced to simplify the procedure by measuring the impedance between ground and each conductor in a pair under test with respective threshold type ohmmeters whose outputs cooperate to actuate but a single warning light and whose respective sources for applying an energizing voltage between each conductor and ground are of opposite polarity. The interconductor impedance then also draws current from the meters, thereby affecting their outputs. When any of three impedances in a pair, namely the two conductor-to-ground impedances and the conductor-to-conductor impedance, is inadequate, the two ohmmeters operate but a single warning light. Thus, a operator accomplishes three measurements with two simple meters in one reading. Preferably one ohmmeter includes multistage amplifiers with n-p-n transistors and the other ohmmeter multistage amplifiers having p-n-p transistors. A Zener diode which is switched in and out of its constant voltage range couples the stages in each ohmmeter to obtain high amplification.

Preferably, the instrument includes means for disabling the impedance measuring devices in response to a conductor pair to be measured being nonvacant, that is, working.

These and other features of the invention, both broader and more specific, are pointed out in the claims forming a part of this specification. Other objects and advantages of the invention will become obvious from the following detailed description when read in light of the accompanying drawing showing a schematic diagram of a portable tester embodying features of the invention.

The description includes values for some components. These values are in no way restrictive as to the way one may practice the invention, but are only illustrative.

In the drawing a main frame 10 of a central telephone office possesses fifty cable pair conections. Each pair includes a ring conductor and a tip conductor. A manual conductor-pair selector 12 selectively connects a lead R and a lead T to the respective ring and tip conductors in each pair. The leads T and R connect to a voltage detector circuit 14, a leakage resistance test circuit 16, a capacitance unbalance test circuit 18, and a capacitance length test circuit 20.

The voltage detector circuit 14 includes at its input two normally closed contacts K1-1 and K1-2 of a relay K which is shown only by its constituent portions, all of which have their reference characters prefaced with K1. Two bocking diodes 22 and 24 pass only currents from negative voltages at either of the lines T, R, or both, to a voltage divider comprising a resistor 26 and a grounded resistor 28. The latter applies a portion of this voltage to the gate of a silicon controlled rectifier 30 whose cathode is grounded. Applying an alternating voltage to the main current path of the silicon controlled rectifier is a 30 volt voltage source 32. An amber lamp 34 and three normally closed contacts S4-1, S5-1, and S6-1 of respective pushbuttons S4, S5 and S6 (shown only by their constituent contacts) connect this anode with the source 32. Forming an alternate path from the alternating voltage source 32 to the anode of the silicon controlled rectifier 30 are three parallel connected and normally open contacts S4-2, S5-2, and S6-2 of the respective pushbuttons S4, S5, and S6, as well as the coil K1-C of the relay K1. A diode 36 connects across the coil K1-C. A 2400 micromicrofarad coupling capacitor 38 forms a high impedance path for alternating current from the source 32 to bias the gate positively during one half cycle.

A pair of normally open relay contacts K1-3 and K1-4 on the relay K1 disconnect the leakage resistance circuit 16, capacitance unbalance circuit 18, and capacitance length circuit 20, from the leads T and R. Energizing the relay coil K1-C to close these contacts enables these previously disabled circuits.

When relay K1 enables the circuit 16 and an operator depresses pushbutton S4, two normally open contacts S4-3 and S4-4 on the pushbutton S4 connect the conductors of the pair being tested through the leads T and R to the respective bases of an n-p-n transistor 42 and a p-n-p transistor 44. A +24 volt source 46 energizes the conductor at the line T and biases the base of transistor 42 through a voltage divider. The latter comprises a 150K resistor 48 and a grounded 0 to 2.5 megohm variable resistor 50. A −24 volt source 51 places a potential at the conductor to be tested on line R, and biases the base of transistor 44 through a voltage divider comprising a 150K resistor 52 in series with a grounded 0 to 2.5 megohm variable resistor 54. Respective capacitors C1 and C2 connect across resistors 50 and 54. A 13K collector resistor 56 and a 1K emitter resistor 58, as well as a 12 volt Zener diode 60 connect in series with the major path of current flow in the transistor 42. A 15 volt Zener diode 61 applies the voltage at the collector of transistor 42 to the base of a transistor 62. The latter energizes a coil K2–C of a relay K2 (shown only by its constituent parts) so as to open its normally closed contacts K2–1 and to close its normally open contact K2–2. An 11K collector resistor 66, a 1K emitter resistor 68, and a 12 volt Zener diode 70 connect in the major current flow path of the transistor 44 and connect it to ground. Receiving the voltage at the collector of the transistor 44 is a 15 volt Zener diode 72 and a transistor 74 whose emitter is grounded and whose collector connects to the −24 volt source 51 through the coil K3–C of relay K3 (shown only by its constituent parts). Energizing of the coil K3–C opens a normally closed contact K3–1 and closes a normally open contact K3–2 on the relay K3. Two impedances 76 and 78 shown in phantom from the respective bases of transistors 42 and 44 to ground represent the impedances between each conductor and ground on the conductor pair being tested. An impedance 80 between the bases of transistors 42 and 44 represents the interconductor impedance.

A pair of normally open contacts S5–3 and S5–4 on the pushbutton S5 connect the capacitance unbalance circuit 18 to the leads T and R through the contacts K1–3 and K1–4. In the circuit 18, the capacitances between ground and each of the conductors being tested form two adjacent arms in a Wheatstone bridge. Two resistors 82 and 84 connected to the conductors form two other adjacent arms of the bridge. A 100 cycle per second oscillator 86 energizes the bridge between the junction of resistors 82 and 84 and ground, and a detector 88 measures the resulting unbalance between the conductors. The detector 88 determines whether the unbalance in the capacitance between two conductors to be measured is less or more than 15 percent, and, if more, energizes a relay coil K4–C which opens a normally closed contact K4–1 and closes a normally open contact K4–2. Excessive unbalance may indicate different lengths of conductors in the pair and thus a break in one. However, the bridge may balance because both have a break. This possibility is eliminated by the circuit 20.

The Wheatstone bridge of the circuit 18 forms part of the length checking circuit 20 to compare the capacitance of one conductor in one pair against the capacitance of a previously tested conductor. When the pushbutton S6 is depressed, normally open contacts S6–3 and S6–4 close and connect the lead T to the resistor 84 and detector 88 on the Wheatstone bridge but connect the other end of detector 88 and resistor 82 to a reference line selector 89 which selects the conductor-to-ground capacitance of a previously tested conductor as an arm in the Wheatstone bridge.

A logic circuit LC which is not conductively connected to the remaining circuits but magnetically through the relays K1, K2, K3 and K4 comprises a 22 volt alternating source 96 energizing a green lamp 92 when current through the coil K1–C closes a contact K1–5 on the relay K1 and the contacts K2–1, K3–1, and K4–1, all in series, remain closed. If any of the latter three contacts are opened by their respective relay coils K2–C, K3–C, or K4–C, one of three parallel normally open contacts K2–2, K4–C, one of three parallel normally open contacts K2–2, K3–2, or K4–2 closes and energizes a red lamp 94 in series therewith while extinguishing the green lamp 92.

In the quiescent state the contacts and pushbuttons are all biased to the position shown in the drawing. The alternating 30 volt source 32 connects to the main current path of the rectifier 30 through the lamp 34 and the closed contacts S4–1, S5–1, and S6–1. During its positive half cycle the source 32 applies a forward voltage to the main current path. At the same time it positively charges the capacitor 38 through the lamp 34, the diode 36, and the resistor 28. The charging current positively biases the gate of silicon controlled rectifier 30 to approximately three-quarter volt and thereby fires it and turns on the lamp 34 for the positive half of the cycle. During the negative half cycle the reverse voltage on the silicon controlled rectifier 30 stops current flow through the rectifier 30, sets it to its nonconducting state, and permits the capacitor 38 to discharge well within the half cycle through the coil K1–C. The discharge current is slightly over one milliampere, not enough to affect coil K1–C. On succeeding cycles this pattern repeats itself. The lamp 34 appears continuously on.

When an operator now connects each of the fifty conductor pairs on the vertical frame of a central telephone switchboard to the manual conductor-pair selector, he sets the selector to one of the pairs. If either conductor exhibits a negative potential relative to ground, the diodes 22 and 24 permit the contacts K1–1 and K1–2 to apply this potential to the resistors 26 and 28. A potential less negative than −11 volts supplies insufficient voltage at the resistor 28 to suppress the normal on-bias at the gate of rectifier 30. Thus, the rectifier 30 fires each half cycle, and the amber light appears to remain on continuously. This indicates that the pair being tested is vacant.

A voltage on the conductors more negative than −11 volts indicates that the conductor pair is working. It applies to the resistor 28 a voltage sufficient to suppress the on-bias of the rectifier 30. The lamp 34 then turns off. Extinction of the rectifier 30 also prevents sufficient current from flowing through the coil K1–C to actuate the relay K1. This keeps contacts K1–3 and K1–4 open, thereby disabling circuits 16, 18, and 20 despite any other action taken by the operator.

When the lit lamp 34 notifies the operator that a vacant pair has been found, he first presses the pushbutton S4. This enables the circuit 16 by closing the contacts S4–2, S4–3, and S4–4. The bases of transistors 42 and 44 now connect through the contacts S4–3, S4–4, K1–3 and K1–4, and the selector 12 to the conductor pair under test. This conductor pair exhibits to the circuit 16 three impedances, namely the impedance 80 shown in phantom between the two conductors, the impedance 76 shown in phantom between the tip conductor and ground, and the impedance 78 shown in phantom between the ring conductor and ground.

The circuit 16 determines whether a short circuit or other leakage exists between the conductors under test or between either conductor and ground. Such leakages generally result in diminishing the interconductor or conductor-to-ground impedances to values less than approximately 100 kilo-ohms. The circuit 16 determines in a single reading whether any of the impedances 76, 78, or 80, representing schematically the interconductor or conductor-to-ground impedances, exhibit such low-leakage-indicating values.

In the circuit 16, the transistors 42 and 44 normally conduct. Resistors 50 and 54, by drawing current from the plus and minus 24 volt sources 46 and 51, produce voltage drops across the resistors 48 and 52. Variable resistors 50 and 54 are set so that the base-to-ground potentials of transistors 42 and 44 approach the respective emitter potentials, i.e., cutoff, when the impedances 76, 78, and 80 exhibit respective values of one-half megohm, one-half megohm, and one megohm. It is the combination of the Zener diodes 60 and 70 and resistors 58 and 68 that establish the voltages on the respective emitters of transistors 42 and 44.

If the interconductor impedance and the two conductor-to-ground impedances all remain at values greater than one megohm, one-half megohm, and one-half megohm, respectively, the current drawn through resistors 48 and 52 remains less than that required for lowering the positive and negative potentials at the respective bases of transistors 42 and 44 to the respective cutoff values. In each case, therefore, the transistors 42 and 44 remain conducting. However, in the event that one of these impedances, for example 76, becomes subject to leakage and its impedance value drops below 100,000 ohms, the current passing through resistor 48 decreases the biasing voltage on the base of transistor 42 to a value less positive than the emitter potential, thereby turning it off.

When the transistor 42 conducts even slightly, the voltage at its collector is insufficient to bias the Zener diode 61 through the base emitter circuit of transistor 62 into the diode's constant voltage range. However, the diminution of impedance 76, turning off transistor 42, raises the collector voltage to nearly that of the 24 volt source 46. This higher potential biases the Zener diode 61 out of its comparatively high impedance variable-voltage range into a comparatively low dynamic impedance constant-voltage range. The prior high impedance coupling value between the transistors 42 and 62 kept the transistor 62 off. However, even a slight change in the conduction of transistor 42 causes a sudden change in the operating condition of the Zener diode, thereby turning the transistor 62 heavily on. This conduction energizes a coil K2-C of a relay K2 whose normally open contact K2-2 thus closes and whose normally closed contact K2-1 thus opens.

The effect of energizing coil K2-C appears in the logic circuit LC. Here, a source 96 normally energizes the green lamp 92 through normally closed contacts K2-1, K3-1, and K4-1 after the coil K1-C, responding to a vacant pair and pressing of button S4, closes the contact K1-5. Closing of contact K2-2 and opening of contact K2-1 by energizing coil K2-C extinguishes the green lamp 92 and passes the current through the source 96 to the red lamp 94. This notifies an operator that the pair under test is defective in its insulation.

The Zener diode 61 assures a comparatively high amplification of the change in condition established by the resistance 76 diminishing the base biasing voltage of transistor 42 below the threshold value. This effect may be described as occurring because the Zener diode 61 operates at the knee of its curve.

A drop in the resistance value of impedance 78 effects a similar result with respect to the normally conducting p-n-p transistor 44 and normally off p-n-p transistor 74, thereby energizing a relay coil K3-C so as to close a normally open contact K3-2 and open a normally closed contact K3-1 in the relay K3.

If the amplifier stages including transistors 42 and 62 were identical to the amplifier stages including transistors 44 and 74, the same voltage would appear at the sources 51 and 46. A decrease in the established resistance value of impedance 80 would then have virtually no effect upon either of the relay coils K2-C or K3-C. However, the circuits including transistors 44 and 74 and the circuits including transistors 42 and 62 are complementary. The voltages at the sources 46 and 51 are opposite. Thus, a decrease in the value of the impedance 80, representing a decrease in the interconductor impedance of the conductor pair being tested, increases the current in both resistors 48 and 52, thereby decreasing the potentials on the respective basis of transistors 42 and 44. A normal leakage reducing the impedance to less than 100,000 ohms would then energize both relays K2 and K3 so as to reverse the conditions of contacts K2-1, K2-2, K3-1, and K3-2.

The threshold value at the bases of transistors 42 and 44 may be reached other than by any one of the impedances 76, 78, or 80 decreasing below the set values of one-half megohm, one-half megohm, and one megohm. Thus, if for example the value of impedance 80 were close to infinite, the impedance 76 would not draw enough current to switch the relay K2 until it had decreased to a value of approximately one-quarter megohm. However, if the impedance 80 were at its established value of one megohm, a resistance 76 having a value of 450,000 ohms would trigger the relay K2. This effect is not considered serious because values down to one-quarter megohm are considered acceptable. Also, values within the range of one-quarter and one-half megohm are sufficiently unlikely to occur that the danger of unintentionally rejecting a conductor pair in this range is remote. Even if such a pair were indicated as unsatisfactory, subsequent tests with other instruments could be made. This type of error would occur only rarely and would never result in acceptance of a bad pair. Similar effects would occur if one of the impedances 76 or 78 were infinite. In any case, only good pairs keep the green light lit.

After checking the leakage resistance an operator can release the pushbutton S4. The operator now presses the pushbutton S5, thereby closing the normally open contacts S5-3 and S5-4. This connects the conductors of the pair being tested to the Wheatstone bridge in circuit 18. The resistors 82 and 84 are equal, thereby balancing the bridge when the capacitances exhibited by the conductors to ground are equal. This capacitance comparison constitutes a comparison of the lengths of the two conductors being measured and hence an indication of breaks in one conductor. Should the bridge unbalance exceed 15 percent, the unbalance detector 88 energizes a coil K4-C of a relay K4 to close the normally open contact K4-2 and open the normally closed contact K4-1. The 22 volt voltage source 96 then passes current through the contact K1-5 that closes with current through the coil K1, and passes current through the contact K4-2, thereby energizing the red light 94. Before the measurement, but after enabling of the circuits 16, 18, and 20, the source 96 energized the green light 92 through the normally closed contacts K2-1, K3-1, and K4-1.

It is possible that despite a good "green light" reading in the circuit 18 a break exists in the conductors. This occurs when open breaks exist in each of the conductors making the lengths of the lines approximately equal. The circuit 20 guards against this possibility after the pushbutton S5 has been released. An operator presses a pushbutton S6. Two normally open contacts S6-3 and S6-4 respond by closing and connect only one of the conductors under test to the Wheatstone bridge. The reference line selector chooses a second previously tested adequate conductor of sufficient length. The Wheatstone bridge, now in circuit 20, remains balanced if the two conductors forming two arms are the same length. Two unequal conductors in the test in circuit 20 unbalance the bridge and produce a signal in the detector 88 for energizing the coil K4-C. The latter coil will then close the contact K4-2 and open the contact K4-1, thereby extinguishing the green light 92 and turning on the red light 94 with the source 96. This signifies a break in one and, if the bridge remained balanced when pushbutton S5 was actuated, probably both conductors in the pair.

The invention permits a simple meter to check many conductor pairs for shorts or breaks in only a few simple steps.

While an embodiment of the invention has been described in detail, it will be obvious to those skilled in the art that the invention may be embodied otherwise without departing from its spirit and scope.

What is claimed is:

1. A test instrument for testing impedance values between three conductors, comprising engagement means forming three points for establishing connections between each of said conductors and a different one of said three points, first and second impedance means each connected to a different one of two of said points, voltage means having an intermediate-value connection connected to said third point and having two extreme connections each connected to a different one of said impedance means for establishing at said first two points respective voltages one of which is more positive and one more negative than the voltage at said third point, and two measuring means each connected to a different one of said first two points and the third point.

2. A testing instrument for testing the impedance between three conductors comprising, engagement means forming three points for establishing connections between each of said conductors and a different one of said three points, two measuring means connected to the engagement means for testing the respective impedances between the first and third points and between the second and third points, and voltage means in each of said measuring means for establishing at each of said points voltages such that the voltage at the third point is intermediate the first and second point, and indicating means responding to each of said measuring means for indicating whether the potential between either of said first two points and the third point falls below a predetermined value.

3. A testing instrument for testing the impedance between three points comprising, two measuring means for testing the respective impedances between the first and third points and between the second and third points, engagement means for selectively connecting said first measuring means across said first and third points and said second measuring means between said second and third points, and voltage means in each of said measuring means for establishing at each of said points voltages such that the voltage at the third point is intermediate the first and second point, said measuring means having transistor amplifiers connected to said voltage means, each of said transistor amplifiers having a corresponding transistor whose junction polarity is opposite to that of the corresponding transistor in the other amplifier, and indicating means responding to each of said measuring means for indicating whether the potential between either of said first two points and the third point falls below a predetermined value.

4. A test set for testing conductor pairs in cables comprising, a pair of leads, means for selectively connecting pairs of conductors to said leads, means for comparing the lead to ground capacitance at each of said leads relative to each other, means for comparing the lead-to-ground capacitance at one of said leads relative to the conductor-to-ground capacitance at a predetermined conductor, insulation impedance checking means for checking the impedance between one of said leads and ground and having a grounded voltage source connected to said lead, and second insulation impedance checking means for checking the impedance between the other of said leads and ground and having a second grounded voltage source connected to said other lead, said second voltage source being opposite in polarity relative to the first, whereby one of said impedance checking means responds to changes in the impedance between the leads; and logic means having an alarm indicator responding to said means for comparing the lead-to-ground capacitances to each other, said means for comparing the lead-to-ground capacitance of one to that of a predetermined conductor pair, and each of said insulation impedance checking means, for energizing said indicator in response to conditions at each of said means to which it responds.

5. A test set for testing conductor pairs in cables comprising, a pair of leads, means for selectively connecting pairs of conductors to said leads, means for comparing the lead-to-ground capacitance at each of said leads relative to each other, means for comparing the lead-to-ground capacitance at one of said leads to the conductor-to-ground capacitance at a predetermined conductor, voltage means having two opposite terminals and a grounded intermediate potential, two impedance means each connecting one of said terminals to a different one of said leads, and two measuring means each connected to ground and to a different one of said leads for measuring the voltages between each lead and ground; and logic means having an alarm indicator responding to said means for comparing the lead-to-ground capacitances to each other, said means for comparing the lead-to-ground capacitance of one to that of a predetermined conductor pair, and each of said insulation impedance checking means, for energizing said indicator in response to conditions at each of said means to which it responds.

6. A test instrument for testing impedance values between three points, comprising first and second impedance means connected respectively to different ones of two of said points, voltage means having an intermediate value connection connected to said third point and having two extreme connections each connected to a different one of said impedance means, two impedance measuring means each connected to a different one of said first two points and to said third point for establishing at said first two points respective voltages one of which is more positive and one more negative than the voltage at said third point, each of said measuring means having two transistor amplifier stages, a voltage threshold member in said first stage of each measuring means for making said stage conduct at one level when the voltage sensed is above one value and conduct at another level when the voltage is below the one value, and a Zener diode coupling said stages in each measuring means, said first stages of each amplifier having corresponding junction polarities opposite to each other.

7. A testing instrument for testing the impedance between three conductors comprising, engagement means forming three points for establishing connections between each of said conductors and a different one of said three points, two measuring means for testing the respective impedances between the first and third points and between the second and third points, voltage means in each of said measuring means for establishing at each of said points voltages such that the voltage at the third point is intermediate the first and second point, said voltage means each having a polarity relative to the third point opposite to the other voltage means, each of said measuring means having two transistor amplifier stages, circuit means in said first stage of each measuring means whose conductance changes abruptly when the voltage across it reaches a threshold value, and a Zener diode coupling said stages in each measuring means, said first stages of each amplifier having corresponding transistors whose corresponding regions have opposite conductivities, and indicating means responding to each of said measuring means for indicating whether the potential between either of said first two points and the third point falls below a predetermined value.

8. A test set for testing conductor pairs in cables comprising, a pair of leads, means for selectively connecting pairs of conductors to said leads, means for comparing the lead-to-ground capacitance at each of said leads relative to each other, means for measuring the lead-to-ground capacitance at one of said leads relative to the conductor-to-ground capacitance at a predetermined conductor, insulation impedance checking means for checking the impedance between one of said leads and ground and having a grounded voltage source connected to said lead, second insulation impedance checking means for checking the impedance between the other of said leads and ground and having a second grounded voltage source connected to said other lead, said second voltage source being opposite in polarity relative to the first, whereby one of said impedance checking means responds to changes in the impedance between the leads, each of said checking means having two transistor amplifier stages, a threshold forming member in the first stage of each of said checking means for making said stage conduct at one level when the voltage sensed is above one value and conduct at another level when the voltage is below the one value, and a Zener diode coupling said stages in each checking means, each of said amplifier stages having transistors whose junction polarities are opposite the other; and logic means having an alarm indicator responding to said means for comparing the lead-to-ground capacitances to each other, said means for comparing the lead-to-ground capacitance of one to that of a predetermined conductor pair, and each of said insulation impedance checking means, for energizing said indicator in response to conditions at each of said means to which it responds.

9. The method of testing the adequacy of impedances between three points which comprises, applying through an impedance a first voltage between the first and second points, simultaneously applying through an impedance and between the second and third points a second voltage that places said first and third points at different potentials with the potential of the third point between these different potentials, simultaneously sensing the respective voltages only between said first and second points and between said second and third points as a measure of the voltage conditions between all three points, and operating a single indicator when any of the sensed voltages are below a predetermined value.

10. The method of testing conductor pairs in a telephone cable which comprises, selecting a vacant conductor pair, applying through an impedance connected to one conductor of the pair a first voltage between said one conductor and ground, simultaneously applying through a second impedance connected to the other conductor of the pair a second voltage between said other conductor and ground that places the two conductors at opposite potentials, simultaneously measuring the potentials at the conductors in the pair and operating a single indicator if the potentials show a low value, comparing the conductor-to-ground capacitances of the conductors in the pair to each other, actuating the indicator in response to predetermined inequality in said last measurement, comparing the conductor-to-ground capacitance of one conductor in the pair to a standard conductor-to-ground capacitance, and operating said one indicator in response to predetermined inequality in said last measurement.

References Cited

UNITED STATES PATENTS

| | | | |
|---|---|---|---|
| 2,474,692 | 6/1949 | Rossoff | 324—57 |
| 2,505,072 | 4/1950 | Sunstein | 324—57 |
| 2,513,583 | 7/1950 | Nicholson | 324—66 X |
| 2,531,145 | 11/1950 | Marco et al. | 324—62 |
| 2,762,870 | 9/1956 | Sziklai et al. | 330—13 X |
| 2,819,352 | 1/1958 | Houck | 330—13 X |
| 2,832,042 | 4/1958 | Lambert | 324—52 |
| 3,195,018 | 7/1965 | Giger | 330—12 |
| 3,205,436 | 9/1965 | Donahue | 324—51 |

RUDOLPH V. ROLINEC, *Primary Examiner.*

WALTER L. CARLSON, *Examiner.*

G. R. STRECKER, *Assistant Examiner.*